(12) United States Patent
Kawano et al.

(10) Patent No.: US 10,886,764 B2
(45) Date of Patent: Jan. 5, 2021

(54) POWER TOOL

(71) Applicant: Hitachi Koki Co., Ltd., Tokyo (JP)

(72) Inventors: Yoshikazu Kawano, Hitachinaka (JP); Kazuhiko Funabashi, Hitachinaka (JP); Toshiaki Koizumi, Hitachinaka (JP); Hironori Mashiko, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 476 days.

(21) Appl. No.: 15/536,946

(22) PCT Filed: Nov. 27, 2015

(86) PCT No.: PCT/JP2015/083428
§ 371 (c)(1),
(2) Date: Jun. 16, 2017

(87) PCT Pub. No.: WO2016/098565
PCT Pub. Date: Jun. 23, 2016

(65) Prior Publication Data
US 2018/0048173 A1 Feb. 15, 2018

(30) Foreign Application Priority Data
Dec. 18, 2014 (JP) .................................. 2014-256730

(51) Int. Cl.
*H02P 7/06* (2006.01)
*H02J 7/00* (2006.01)
(Continued)

(52) U.S. Cl.
CPC .............. *H02J 7/0063* (2013.01); *B25F 5/00* (2013.01); *B25F 5/02* (2013.01); *H01M 10/486* (2013.01);
(Continued)

(58) Field of Classification Search
CPC ............. H02J 7/0063; H02J 2007/0067; H02J 7/0029; B25F 5/02; B25F 5/00; H01M 10/486; H01M 2220/30
(Continued)

(56) References Cited

U.S. PATENT DOCUMENTS

2003/0151393 A1 8/2003 Takano et al.
2006/0220605 A1 10/2006 Funabashi et al.
(Continued)

FOREIGN PATENT DOCUMENTS

CN 102712088 A 10/2012
CN 102802878 A 11/2012
(Continued)

OTHER PUBLICATIONS

International Report on Patentability for application PCT/JP2015/083428 (dated Jun. 29, 2017), 9 pages.
(Continued)

*Primary Examiner* — Eduardo Colon Santana
*Assistant Examiner* — Zemenay T Truneh
(74) *Attorney, Agent, or Firm* — Kilpatrick Townsend & Stockton LLP

(57) ABSTRACT

A power tool includes: a battery connecting part to which one of a first battery pack and a second battery pack having capacity smaller than that of the first battery pack is detachably attachable; a motor driven by electric power supplied from the battery pack; current detection means configured to detect a discharge current flowing from the battery pack to the motor; cut-off controlling means configured to cut off the discharge current when the discharge current becomes equal to or larger than a current threshold; and battery type discrimination means configured to discriminate the battery pack connected to the battery connecting part. The current threshold when the second battery pack is connected to the
(Continued)

battery connecting part is lower than that when the first battery pack is connected to the battery connecting part.

5 Claims, 8 Drawing Sheets

(51) Int. Cl.
    *B25F 5/00* (2006.01)
    *B25F 5/02* (2006.01)
    *H01M 10/48* (2006.01)
(52) U.S. Cl.
    CPC ........ *H01M 10/48* (2013.01); *H01M 2220/30* (2013.01); *H02J 7/0029* (2013.01); *H02J 7/00036* (2020.01); *H02J 2007/0067* (2013.01)
(58) Field of Classification Search
    USPC .......................................... 318/139; 307/130
    See application file for complete search history.

(56) References Cited

U.S. PATENT DOCUMENTS

| | | | |
|---|---|---|---|
| 2009/0108806 A1 | 4/2009 | Takano et al. | |
| 2011/0163701 A1* | 7/2011 | Carrier ................ | H02J 7/00036 318/139 |
| 2012/0234803 A1 | 9/2012 | Liu et al. | |
| 2012/0274245 A1 | 11/2012 | Takano et al. | |
| 2012/0293096 A1* | 11/2012 | Mizoguchi ............ | H01M 10/48 318/139 |
| 2013/0015789 A1 | 1/2013 | Miyazaki et al. | |
| 2013/0027828 A1 | 1/2013 | Noda et al. | |
| 2013/0082627 A1 | 4/2013 | Ichikawa et al. | |
| 2013/0098646 A1* | 4/2013 | Funabashi ................ | B25F 5/00 173/2 |
| 2013/0255980 A1 | 10/2013 | Linehan et al. | |
| 2014/0131059 A1 | 5/2014 | Verbugge et al. | |
| 2014/0297144 A1 | 10/2014 | Wakao | |
| 2016/0049636 A1 | 2/2016 | Takano et al. | |

FOREIGN PATENT DOCUMENTS

| | | |
|---|---|---|
| CN | 102859823 A | 1/2013 |
| CN | 102986305 A | 3/2013 |
| CN | 202957623 U | 5/2013 |
| CN | 103813887 A | 5/2014 |
| CN | 104070997 A | 10/2014 |
| EP | 2579446 A2 | 4/2013 |
| JP | 2003-157905 A | 5/2003 |
| JP | 2006-247821 A | 9/2006 |
| JP | 2006-281404 A | 10/2006 |
| JP | 2008-177138 A | 7/2008 |
| JP | 2011-156625 A | 8/2011 |
| JP | 2011-211861 A | 10/2011 |
| JP | 2012-051064 A | 3/2012 |
| JP | 2012-213825 A | 11/2012 |
| JP | 2013-066959 A | 4/2013 |
| JP | 2013-081285 A | 5/2013 |
| JP | 2014-027803 A | 2/2014 |
| WO | WO2014148228 A1 | 2/2017 |

OTHER PUBLICATIONS

International Search Report for international application PCT/JP2015/083428 (dated Feb. 16, 2016), 9 pages.
Japan Patent Office Notification of Reasons of Refusal for patent application JP2016-564765 (dated May 31, 2018), 10 pages with translation.
European Patent Office Extended Search for EP15869773.0 dated Aug. 29, 2018, 9 pages.
Japan Patent Office Office Action for patent application JP2016-564765 (dated Nov. 22, 2018), 6 pages with translation.
China Patent Office office action for patent application CN201580069127.1 (dated Jan. 24, 2019), 27 pages with translation.
China Patent Office office action for patent application CN201580069127.1 (dated Sep. 16, 2019), 23 pages with translation.
"Car electrician and electric fitter" Rolling Stock Bureau, Ministry of Railways, pp. 281-283, 28 pages with translation (Oct. 1988).
"Automotive electrical equipment" Shanghai Automotive Driving Technical School, pp. 7-11, 24 pages with translation (Sep. 1989).
China Patent Office office action for patent application 201580069127.1 (dated Apr. 13, 2020), 23 pages with translation.
"Report on the status and development trends of patent technologies in various industries" China Intellectual Property Research Association, intellectual Property Press, p. 284, 5 pages with translation (Jan. 2009).
Winju "Questions and answers on the overhaul of automotive electrical systems" Posts and Telecommunications Press, p. 302, 6 pages with translation (Apr. 1999).
Daily maintenance and management of battery packs for mobile communication base stations Gansu Science and Technology Publishing House, p. 26, 5 pages with translation (Aug. 2007).
Jinglu "Automotive Tractor Electrical Equipment" China Agricultural Machinery Press, p. 17, 9 pages with translation (Oct. 1983).
Schering "Lead battery" pp. 114-115, 6 pages with translation (Oct. 1983).

* cited by examiner

| BATTERY TYPE | BATTERY TYPE DISCRIMINATION RESISTOR | BATTERY TYPE DISCRIMINATION VOLTAGE | VOLTAGE RANGE FOR DISCRIMINATION |
|---|---|---|---|
| A | 1kΩ | 0.5V | 0~1.0V |
| B | 4.3kΩ | 1.5V | 1.0~2.0V |
| C | 10kΩ | 2.5V | 2.0~3.0V |
| D | 24kΩ | 3.5V | 3.0~4.0V |
| E | 91kΩ | 4.5V | 4.0~5.0V |

FIG. 3

| BATTERY TYPE | BATTERY TEMPERATURE | CONDITION① | CONDITION② | CONDITION③ |
|---|---|---|---|---|
| A | BELOW 100°C | 70A OR MORE, 10s | 100A OR MORE, 3s | 120A OR MORE, 0.1s |
|   | 100°C OR MORE | STOP | | |
| B | BELOW 80°C | 50A OR MORE, 10s | 80A OR MORE, 3s | 100A OR MORE, 0.1s |
|   | 80°C OR MORE | STOP | | |
| C | BELOW 70°C | 30A OR MORE, 10s | 60A OR MORE, 3s | 80A OR MORE, 0.1s |
|   | 70°C OR MORE | STOP | | |
| D | BELOW 60°C | 20A OR MORE, 10s | 40A OR MORE, 3s | 60A OR MORE, 0.1s |
|   | 60°C OR MORE | STOP | | |
| E | BELOW 50°C | 10A OR MORE, 10s | 20A OR MORE, 3s | 40A OR MORE, 0.1s |
|   | 50°C OR MORE | STOP | | |

POWER TOOL

TECHNICAL FIELD

The present invention relates to a power tool connectable to a battery pack.

BACKGROUND ART

Conventionally, widely used are power tools which use electric power from a battery pack to rotate a motor for performing a predetermined operation. As to such power tools, Patent literature 1 discloses a power tool connectable to a plurality of types of battery packs whose rated discharge currents, rated temperatures, and the like are different from one another, that is, a plurality of battery packs whose battery types are different from one another. Further, the disclosed power tool performs discharge control. In the discharge control, the power tool detects the temperature of the battery pack, and stops discharge from the battery pack when the detected temperature exceeds a specific temperature.

CITATION LIST

Patent Literature

[PTL 1]
Japanese Patent Application Publication No. 2003-157905

SUMMARY OF INVENTION

Technical Problem

In the above-described power tool, when the specific temperature for stopping discharge is set on the basis of the lowermost rated temperature among all of the rated temperatures of the connectable battery packs for the purpose of suppressing deterioration or malfunction on all of the connectable battery packs, if a battery pack having relatively high rated temperature among the connectable battery packs is connected to the power tool, discharge may be stopped at a temperature at which stop of the discharge is unnecessary. In the aforementioned scenario, the inherent performance of the battery pack cannot be sufficiently exhibited and the power tool cannot perform appropriate discharge control. Further, in the above-described power tool, when the specific temperature for stopping the discharge is set on the basis of a battery pack having relatively high rated temperature in an attempt to sufficiently exhibit performance of the battery pack having relatively high rated temperature, a battery pack having relatively low rated temperature is not suitably protected, disabling proper discharge control. In this way, the power tool according to the patent literature 1 involves a problem that appropriate discharge control cannot be performed with regard to each of the battery packs whose battery types are different from each other.

In view of the foregoing, it is an object of the present invention to provide a power tool capable of performing appropriate discharge control for each of the battery packs whose battery types are different from each other.

Solution to Problem

In order to attain above and other object, the present invention provides a power tool including a battery connecting part, a motor, current detection means, cut-off controlling means, and battery type discrimination means. One of a first battery pack and a second battery pack having capacity smaller than that of the first battery pack is detachably attachable to the battery connecting part. The motor is driven by electric power supplied from the battery pack. The current detection means is configured to detect a discharge current which flows from the battery pack to the motor. The cut-off controlling means is configured to cut off the discharge current when the discharge current becomes equal to or larger than a current threshold. The battery type discrimination means is configured to discriminate the battery pack connected to the battery connecting part. The current threshold when the second battery pack is connected to the battery connecting part is lower than that when the first battery pack is connected to the battery connecting part.

With this configuration, respective battery packs can be appropriately protected, and the battery packs can sufficiently exhibit their performance, since discharge current can be restricted in accordance with the battery types (connecting mode of the battery cells) of the battery packs.

Further, it is preferable that: when the discharge current becomes equal to or larger than the current threshold, the discharge current is cut off after elapse of a specific time period; and the larger the discharge current becomes, the shorter the specific time period becomes.

With this structure, discharge current can be cut off with a shorter time period when greater discharge current flows. Accordingly, deterioration or malfunction of the battery pack can be appropriately restrained. Further, work efficiency can be improved, since flowing period of the discharge current slightly exceeding the overcurrent threshold can be longer than that of the discharge current largely exceeding the overcurrent threshold.

Further, it is preferable that: the power tool further includes battery temperature detection means configured to detect a battery temperature of the battery pack; the discharge current is cut off when the battery temperature is equal to or higher than a temperature threshold; and the temperature threshold for the second battery pack is lower than the temperature threshold for the first battery pack.

With this structure, discharge current can be cut off on the basis of the temperature. Therefore, deterioration or malfunction of the battery pack can further be restrained.

According to another aspect of the present invention, there is provided a power tool including a battery connecting part, a motor, current detection means, battery temperature detection means, cut-off controlling means, and battery type discrimination means. A battery pack is detachably attachable to the battery connecting part. The motor is driven by electric power supplied from the battery pack. The current detection means is configured to detect a discharge current which flows from the battery pack to the motor. The battery temperature detection means is configured to detect a battery temperature of the battery pack. The cut-off controlling means is configured to cut off the discharge current when a specific condition on the discharge current is met. The battery type discrimination means is configured to discriminate a battery type of the battery pack connected to the battery connecting part. The specific condition is changed in accordance with the battery type of battery. The discharge current is cut off when the battery temperature is equal to or higher than a temperature threshold, whereas an allowable discharge duration is changed in accordance with magnitude of the discharge current when the battery temperature is lower than the temperature threshold.

Further, it is preferable that the larger the discharge current becomes, the shorter the allowable discharge duration becomes.

According to still another aspect of the present invention, there is provided a power tool including a battery connecting part, a motor, current detection means, cut-off controlling means, and battery type discrimination means. A battery pack is detachably attachable to the battery connecting part. The motor is driven by electric power supplied from the battery pack. The current detection means is configured to detect a discharge current which flows from the battery pack to the motor. The cut-off controlling means is configured to cut off the discharge current when a specific condition on the discharge current is met. The battery type discrimination means is configured to discriminate a battery type of the battery pack connected to the battery connecting part. The specific condition is changed in accordance with the battery type of the battery pack.

With this structure, the specific condition with respect to the discharge current can be changed in accordance with the battery type of the connected battery pack, and the discharge current can be cut off using the specific condition with respect to the discharge current in accordance with the battery type. Accordingly, appropriate specific condition on the discharge current can be set with respect to each of the battery packs whose battery types are different from each other, each of the battery packs can be appropriately protected, and the each of the battery packs can sufficiently exhibit its performance. That is, appropriate discharge control can be performed with respect to each of the battery packs whose battery types are different from each other.

Further, it is preferable that: the power tool further includes battery temperature detection means configured to detect a battery temperature of the battery pack; the cut-off controlling means is further configured to, when the battery temperature is equal to or higher than a temperature threshold, cut off the discharge current regardless of whether the specific condition is met.

With this structure, when the battery temperature which largely exerts influence on deterioration and malfunction of the battery pack becomes equal to or higher than a temperature threshold, the discharge current can be cut off regardless of whether the specific condition is met. Therefore, deterioration or malfunction of the battery pack can further be restrained Further, preferably, the specific condition is met when a state where the discharge current is equal to or larger than an overcurrent threshold continues for a specific time period.

With this structure, when a state where the discharge current is equal to or larger than the overcurrent threshold occurs and this state continues for the specific time period, the discharge current is cut off. Accordingly, by properly setting the specific time period, the discharge can continue without cutting off the discharge current, that is, operation can be continued, in a case where the discharge current becomes equal to or larger than the overcurrent threshold for only a moment (such as start-up timing of the motor). Thus, work efficiency can be improved.

Further, it is preferable that: when the discharge current is equal to a first current value which is equal to or larger than the overcurrent threshold, the specific time period is a first time period; and when the discharge current is equal to a second current value which is larger than the first current value, the specific time period is a second time period which is shorter than the first time period.

With this configuration, when higher discharge current flows in a state where the discharge current is equal to or larger than the overcurrent threshold, the discharge current can be cut off within a shorter time period. Accordingly, the discharge current largely exceeding the overcurrent threshold can be cut off within the shorter time period, thereby properly restraining deterioration or malfunction of the battery pack. Further, work efficiency can be improved since flowing period of the discharge current slightly exceeding the overcurrent threshold can be longer than that of the discharge current largely exceeding the overcurrent threshold.

Further, it is preferable that: the power tool further includes an accommodation case accommodating the cut-off controlling means; the cut-off controlling means is configured to be connected to the battery pack through a lead wire; and the accommodation case has a rib portion holding the lead wire With this structure, breaking of the lead wire due to vibration can be restrained, and assemblability can be improved since the lead wire connecting the cut-off controlling means to the battery pack is held by the accommodation case.

Advantageous Effects of Invention

According to the present invention, a power tool capable of performing proper discharge control for each of battery packs whose battery types are different from each other can be provided.

BRIEF DESCRIPTION OF DRAWINGS

FIG. 3 is a cutoff condition table in the power tool according to the embodiment of the present invention;

DESCRIPTION OF EMBODIMENTS

Figures 1, 2:
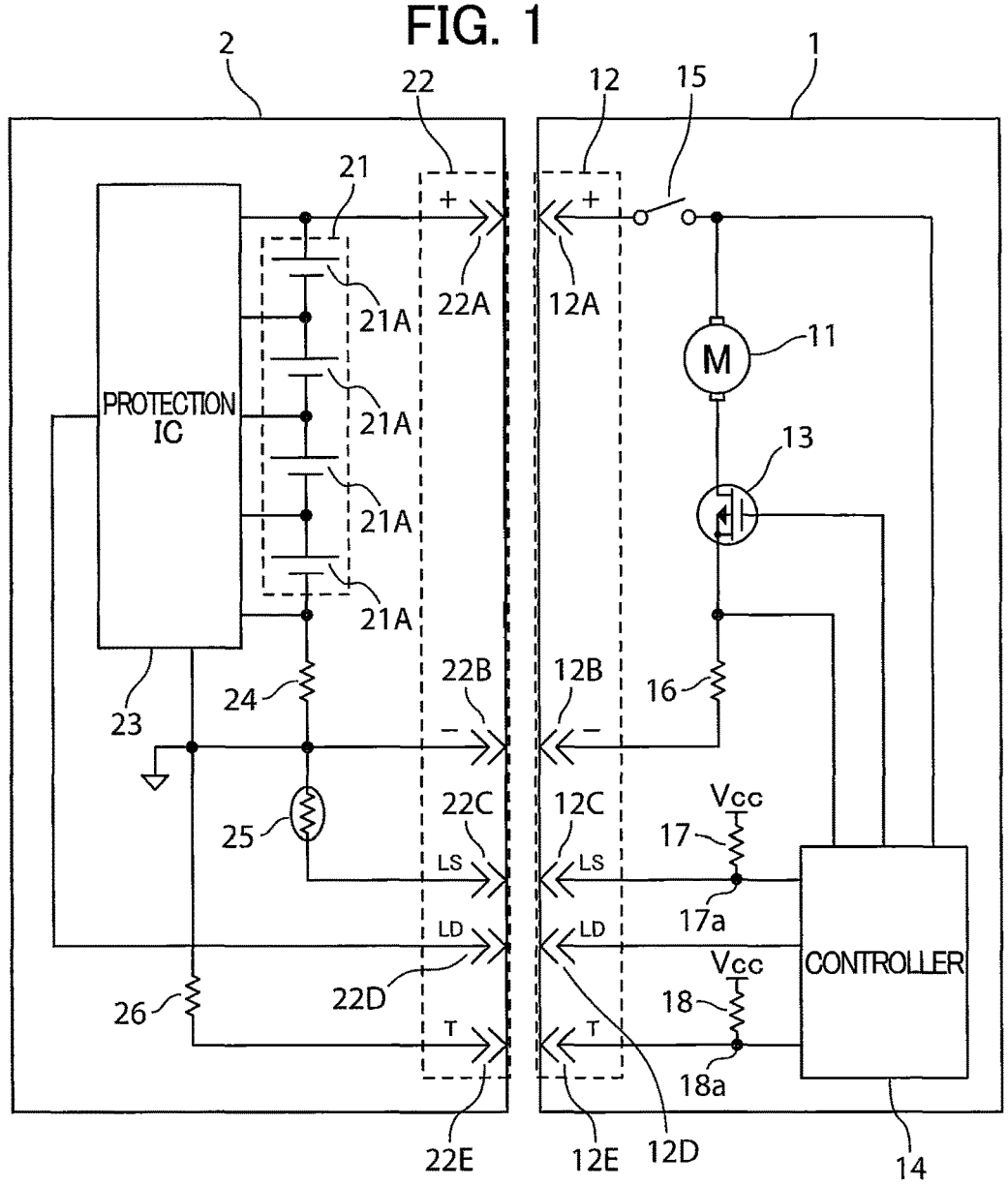
FIG. 1 is a circuit diagram including a block diagram illustrating electrical configurations of a power tool according to an embodiment of the present invention and a battery pack connected to the power tool.
FIG. 2 is a battery type discrimination table in the power tool according to the embodiment of the present invention.
Figure 9:
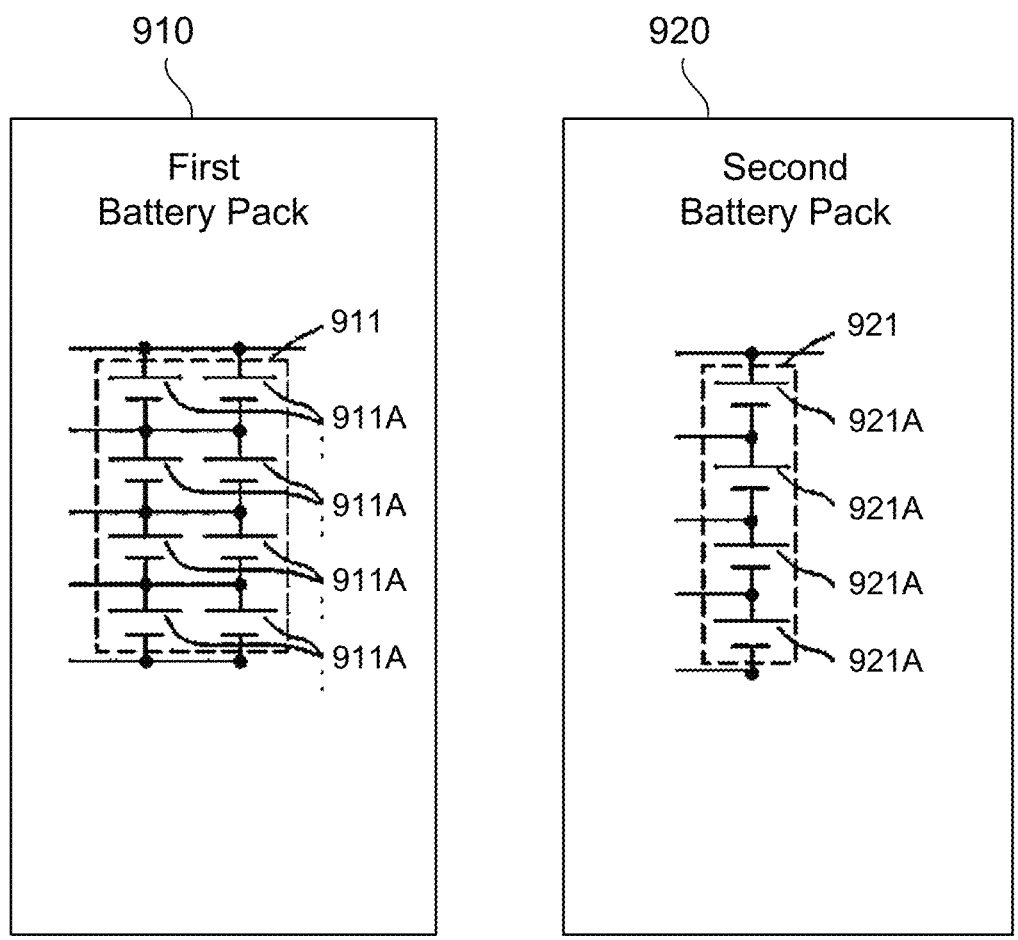
FIG. 9 is a block diagram illustrating two exemplary types of battery packs for a power tool according to an embodiment of the present invention and a battery pack connected to the power tool.

Hereinafter, a power tool 1 according to an embodiment of the present invention will be described with reference to FIGS. 1 to 4. The power tool 1 is an electrically powered tool, such as a disk grinder, which has an output part (not illustrated) to which an end tool is attached to rotate. The power tool 1 is configured such that a battery pack 2 can be attached to and detached from the power tool 1. In the power tool 1, a motor 11 is driven to rotate using the battery pack 2 as a power source and the output part (not illustrated) rotates to rotate the end tool (not illustrated), so that the power tool 1 is ready for work. The power tool 1 is further configured such that another type of battery pack other than the battery pack 2, in other words, a battery pack whose battery type is different from the battery pack 2, can also be connected to the power tool 1. Description of the battery type, for example, battery types A, B, C, D, and E, will be made later. FIG. 9 is a simplified diagram illustrating two types of battery packs that can be attached to and detached from the power tool having a battery connecting part. A first battery pack 910 can be a battery pack of a first battery type. A second battery pack 920 can be a battery pack having another battery type. For example, the first battery pack 910 may have a greater number of parallel connections of the battery cells than the second battery pack 920. As shown in FIG. 9, the first battery pack 910 may have a battery cell assembly 911 including two parallel connections of battery cells 911A, and the second battery pack 920 may have a battery cell assembly 921 including one parallel connections of battery cells 921A. A more detailed description can be found in FIG. 1. FIG. 1 is a circuit diagram which includes a block diagram illustrating electrical configurations of the power tool 1 and the battery pack 2, and which illustrates a state where the power tool 1 and the battery pack 2 are connected to each other.

In the following description, when the description refers to a specific numerical value, such as "5 seconds" in time, the description is intended to include not only a case where a numerical value is exactly the same as the above-described numerical value, but also a case where a numerical value is substantially the same as the above-described numerical value. Also, when the description refers to a positional relationship, such as "parallel", "orthogonal", or "opposite", the description is intended to include not only a case where a positional relationship is in a perfectly parallel condition, a perfectly orthogonal condition, or a perfectly opposite condition, but also a case where a positional relationship is in a substantially parallel condition, a substantially orthogonal condition, or a substantially opposite condition.

First, the battery pack 2 that serves as a driving power source for the power tool 1 will be described. As illustrated in FIG. 1, the battery pack 2 mainly includes a battery cell assembly 21, a battery-side terminal part 22, and a protection IC 23. The battery pack 2 further includes a casing (not illustrated). The casing is provided with a tool connection part which is connectable to the power tool 1.

The battery cell assembly 21 is an assembly in which four battery cells 21A are connected in series to each other, and is accommodated in the casing (not illustrated) of the battery pack 2. A positive terminal of a battery cell 21A with the highest electric potential in the battery cell assembly 21 is connected to the battery-side terminal part 22. A negative terminal of a battery cell 21A with the lowest electric potential in the battery cell assembly 21 is connected, via a shunt resistor 24, to ground and the battery-side terminal part 22. A positive terminal and a negative terminal of each of the battery cells 21A are connected to the protection IC 23; the voltages of all the four cells are individually monitored by the protection IC 23. In the present embodiment, the battery cell 21A is a lithium secondary battery, and has a rated voltage of 3.6V. The battery type of the battery pack is Type C.

Here, the battery type of the battery pack will be described. The battery type is a classification of the battery pack. The battery type is classified depending on characteristics of the battery cell assembly contained in the battery pack. The characteristics of the battery cell assembly are characteristics of the battery cell assembly as a whole, which should be considered in charge and discharge control and include a rated voltage, a rated discharge current, a rated temperature, an over-discharge threshold based on the rated voltage, an overcurrent threshold based on the rated discharge current, and a maximum allowable temperature based on the rated temperature, of the battery cell assembly as a whole. Thus, if the battery type is different, the characteristics, such as the overcurrent threshold, the maximum allowable temperature, and the like, are also different. If the battery type is the same, the characteristics are also the same. In addition, if the battery type is discriminated, the characteristics are also identified.

Specifically, if the number of battery cells of the battery cell assembly, a connection configuration, that is, the number of parallel connections and the number of series connections, the rated voltage per cell, the rated discharge current, the maximum allowable temperature are different, the battery type is also different. For example, even in a case where the rated voltage per cell is the same and the battery cell assembly has six battery cells, a battery pack (1-para) having a battery cell assembly with a configuration in which the three battery cells are connected in series and no battery cells are connected in parallel, a battery pack (2-para) having a battery cell assembly with a configuration in which two sets of three series-connected battery cells are connected in parallel, a battery pack (3-para) having a battery cell assembly with a configuration in which three sets of two series-connected battery cells are connected in parallel to each other, and a battery pack having a battery cell assembly with a configuration in which the six battery cells are connected in series, are different from each other in characteristics, such as the rated voltage, the rated discharge current, and the like of the battery cell assembly as a whole, and thus are different in battery type. In addition, the battery type is different also in a case where the battery cell is different in size. For example, the battery type is different also in a case where the battery pack is different in capacity of the battery pack, due to a difference in the number of parallel connections (para number) of the battery cells, or in size of a battery cell.

The battery-side terminal part 22 is provided in the connection part of the casing (not illustrated), and includes a positive discharge terminal 22A, a negative discharge terminal 22B, a temperature signal terminal 22C, a stop signal terminal 22D, and a battery type discrimination terminal 22E. When the battery pack 2 is connected to the power tool 1, the five terminals, i.e., the positive discharge terminal 22A, the negative discharge terminal 22B, the temperature signal terminal 22C, the stop signal terminal 22D, and the battery type discrimination terminal 22E are connected to a predetermined terminal part which is provided in the power tool 1.

The positive discharge terminal 22A is connected to the positive terminal of the battery cell 21A with the highest electric potential in the battery cell assembly 21. The positive discharge terminal 22A is a terminal for discharging. When the battery pack 2 is connected to the power tool 1, the positive discharge terminal 22A is connected to a discharge path that is provided in the power tool 1 for allowing discharge current to flow. During the discharge, the electric power is supplied from the battery cell assembly 21 (battery cells 21A) to the power tool 1 through the positive discharge terminal 22A.

The negative discharge terminal 22B is connected to the negative terminal of the battery cell 21A with the lowest electric potential in the battery cell assembly 21 via the shunt resistor 24, and is also connected to ground. When the battery pack 2 is connected to the power tool 1, the negative discharge terminal 22B is connected to the discharge path of the power tool 1. The shunt resistor 24 is a resistor used to detect a current which flows through the battery cell assembly 21 during charge and discharge, and both ends of the shunt resistor 24 are connected to the protection IC 23.

The temperature signal terminal 22C is connected to ground via a thermistor 25 disposed adjacent to the battery cells 21A. The temperature signal terminal 22C outputs a battery temperature signal to the power tool 1 by utilizing a property of the thermistor 25, in which property the resistance value of the thermistor 25 changes. The battery temperature signal indicates battery temperature of the battery pack 2 (temperature of the battery cell assembly 21).

The stop signal terminal 22D is connected to the protection IC 23, and outputs to the power tool 1 a discharge stop signal outputted from the protection IC 23.

The battery type discrimination terminal 22E is connected to ground via a battery type discrimination resistor 26. The battery type discrimination resistor 26 has a unique resistance value specific to the battery type of the battery pack 2. When the battery pack 2 is connected to the power tool 1, the power tool 1 reads the resistance value of the battery type discrimination resistor 26 and discriminates the battery type of the battery pack 2. The discrimination of the battery type which is performed by the power tool 1 will be described in detail later.

The protection IC 23 is an IC which individually monitors a voltage of each of the battery cells 21A constituting the battery cell assembly 21. When even one of the battery cells 21A is determined to be in an over-discharge state, the protection IC 23 outputs the discharge stop signal from the stop signal terminal 22D to the power tool 1. In addition, the protection IC 23 reads a voltage drop value of the shunt resistor 24, and calculates a current value from the voltage drop value.

Next, the power tool 1 will be described. As illustrated in FIG. 1, the power tool 1 mainly includes a motor 11, a tool-side terminal part 12, an FET 13, and a controller 14. The power tool 1 further includes a housing (not illustrated).

The motor 11 is accommodated in the housing (not illustrated), and is connected to the tool-side terminal part 12 via a switch 15. The motor 11 is driven by the electric power supplied from the battery pack 2 through the tool-side terminal part 12. The switch 15 is a slide-type switch which is manipulated by a user. When the switch 15 is in an on-state, the tool-side terminal part 12 and the motor 11 are connected to each other. On the other hand, when the switch 15 is in an off-state, the tool-side terminal part 12 and the motor 11 are disconnected from each other. That is, the switch 15 in its on-state allows the discharge current to flow to the motor 11 from the battery pack 2, but the switch 15 in its off-state cuts off the discharge current.

The tool-side terminal part 12 is provided in a battery attachment part provided in the housing (not illustrated), the battery pack 2 being detachably attachable to the battery attachment part. The tool-side terminal part 12 includes a positive terminal 12A, a negative terminal 12B, a temperature terminal 12C, a signal terminal 12D, and a discrimination terminal 12E.

The positive terminal 12A is a terminal which is connected to the positive discharge terminal 22A of the battery pack 2 in a state where the battery pack 2 is connected to the power tool 1. The positive terminal 12A is connected to the motor 11 and the controller 14 via the switch 15. The battery attachment part is an example of the battery connecting part of the present invention. The tool-side terminal part 12 is an example of the battery connecting part of the present invention.

The negative terminal 12B is a terminal configured to be connected to the negative discharge terminal 22B of the battery pack 2. The negative terminal 12B is connected to the motor 11 via a shunt resistor 16 and the FET 13. The shunt resistor 16 is a resistor used to detect a discharge current which flows through the motor 11. One end of the shunt resistor 16 is connected to the controller 14. The controller 14 reads a voltage drop value of the shunt resistor 16, and calculates the discharge current value from the voltage drop value. The shunt resistor 16 and the controller 14 function as the current detection means of the present invention.

When the positive terminal 12A and the negative terminal 12B are respectively connected to the positive discharge terminal 22A and the negative discharge terminal 22B of the battery pack 2, the discharge path that connects the battery cell assembly 21 and the motor 11 and allows the discharge current to flow in the motor 11 is formed.

The temperature terminal 12C is a terminal configured to be connected to the temperature signal terminal 22C of the battery pack 2. The temperature terminal 12C is connected to a reference voltage Vcc via a voltage-dividing resistor 17. In a state where the temperature terminal 12C and the temperature signal terminal 22C of the battery pack 2 are connected to each other, the reference voltage Vcc is connected to ground of the battery pack 2 via the voltage-dividing resistor 17 and the thermistor 25. In this state, the reference voltage Vcc is divided by the voltage-dividing resistor 17 and the thermistor 25, and thus a divided voltage appears at a connection point (i.e., a voltage-dividing point 17a) between the voltage-dividing resistor 17 and the temperature terminal 12C. The divided voltage that appears at the voltage-dividing point 17a is outputted, as the battery temperature signal, to the controller 14 that is connected to the voltage-dividing point 17a. The controller 14 calculates the battery temperature of the battery pack 2 on the basis of the divided voltage appearing at the voltage-dividing point 17a, that is, on the basis of the battery temperature signal. In the present embodiment, the reference voltage Vcc is 5V, and the resistance value of the voltage-dividing resistor 17 is 10 kΩ. The temperature terminal 12C and the controller 14 function as the battery temperature detection means of the present invention.

The signal terminal 12D is a terminal configured to be connected to the stop signal terminal 22D of the battery pack 2. The signal terminal 12D is connected to the controller 14. When the protection IC 23 of the battery pack 2 outputs the discharge stop signal, the discharge stop signal is inputted to the controller 14 through the stop signal terminal 22D of the battery pack 2 and the signal terminal 12D.

The discrimination terminal 12E is a terminal configured to be connected to the battery type discrimination terminal 22E of the battery pack 2. The discrimination terminal 12E is connected to the reference voltage Vcc via a voltage-dividing resistor 18. In a state where the discrimination terminal 12E and the battery type discrimination terminal 22E of the battery pack 2 are connected to each other, the reference voltage Vcc is connected to ground of the battery pack 2 via the voltage-dividing resistor 18 and the battery type discrimination resistor 26. In this state, the reference voltage Vcc is divided by the voltage-dividing resistor 18 and the battery type discrimination resistor 26, and thus a divided voltage appears at a connection point (i.e., a voltage-dividing point 18a) between the voltage-dividing resistor 18 and the discrimination terminal 12E. The divided voltage that appears at the voltage-dividing point 18a is a battery type discrimination voltage used to discriminate the battery type of the battery pack 2. The battery type discrimination voltage is outputted to the controller 14 that is connected to the voltage-dividing point 18a. The controller 14 discriminates the battery type of the battery pack 2 by reading the resistance value of the battery type discrimination resistor 26 on the basis of the divided voltage appearing at the voltage-dividing point 18a, that is, on the basis of the battery type discrimination voltage. The relationship between the battery type of the battery pack 2, the resistance value of the battery type discrimination resistor 26, and the divided voltage at the voltage-dividing point 18a will be described in detail later. In the present embodiment, the resistance value of the voltage-dividing resistor 18 is 10 kΩ. The discrimination terminal 12E and the controller 14 function as the battery type discrimination means of the present invention.

The FET 13 is a P-channel field-effect transistor. The FET 13 has a drain connected to the motor 11, a source connected to the negative terminal 12B via the shunt resistor 16, and a gate connected to the controller 14. The FET 13 is in an on-state during a time period for which a voltage signal (high signal) is outputted from the controller 14 to the gate. On the other hand, the FET 13 is in an off-state during a time period for which the voltage signal is not outputted. That is, when both the FET 13 and the switch 15 are in their on-state, the discharge current flows in the motor 11 to drive the motor 11. When even one of the FET 13 and the switch 15 is brought into its off-state, the discharge current does not flow in the motor 11 and the drive is stopped. The controller 14 can cut off the discharge current flowing in the motor 11 by placing the FET 13 in its off-state.

The controller 14 mainly includes: an arithmetic section having a central processing unit (CPU) (not illustrated) that performs calculation on the basis of a discharge control program and various data which are used for the discharge control; a memory section having a ROM (not illustrated) used to store the discharge control program, the various data, various thresholds and the like; a RAM (not illustrated) used to temporarily store data; and a timer used to measure time. In the present embodiment, the controller 14 is a microcomputer.

Figure 4:
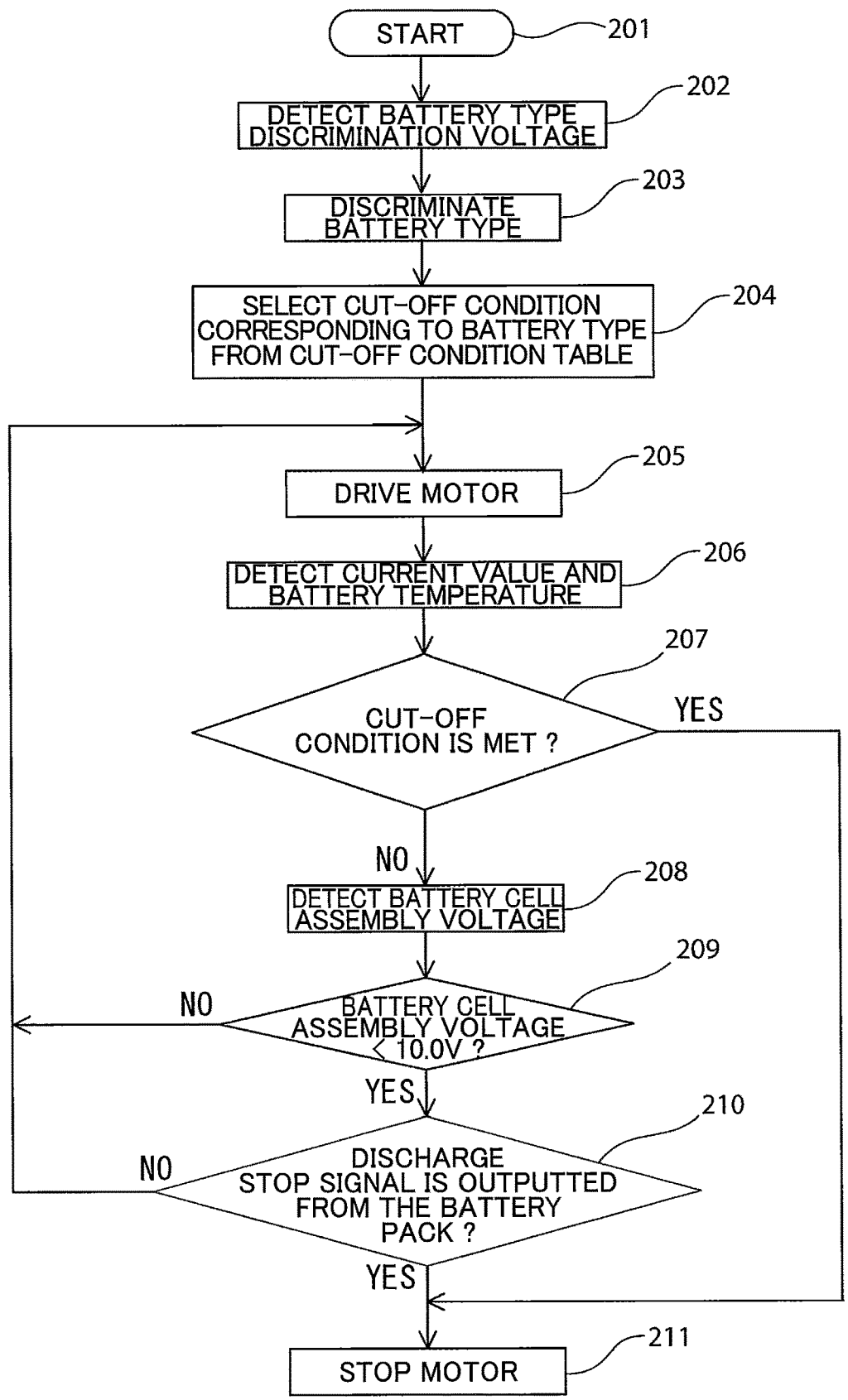
FIG. 4 is a flowchart illustrating discharge control executed by a controller of the power tool according to the embodiment of the present invention.

Next, the discharge control performed by the controller 14 will be described while referring to FIGS. 2 to 4. The controller 14 performs the discharge control in accordance with the discharge control program. In the discharge control, the controller 14 discriminates the battery type of the battery pack connected to the power tool 1, and sets a most appropriate cutoff condition for the discriminated battery type. Further, in the discharge control, when the set cutoff condition is met, the controller 14 cuts off the discharge current to protect the battery pack. FIGS. 2 and 3 are, respectively, a battery type discrimination table and a cutoff condition table, which are pre-stored in the memory section of the controller 14. FIG. 4 is a flowchart which illustrates the discharge control performed in accordance with the discharge control program. The controller 14 functions as the cut-off controlling means of the present invention.

Here, the cutoff condition is a condition to determine whether the discharge current is in a state where the discharge current should be cut off. The cutoff condition is closely related to the characteristics of the battery pack, such as the rated discharge current, the rated temperature and the like. Thus, when the battery type is different, the cutoff condition is also different. The state where the discharge current should be cut off denotes a state where higher priority should be given to the protection of the battery pack than work efficiency by cutting off the discharge current because the battery cell assembly (battery cells) is highly likely to deteriorate rapidly if the current situation continues.

Here, the discrimination of the battery type performed by the controller 14 will be described. The controller 14 discriminates the battery type by detecting the battery type discrimination voltage and referencing the battery type discrimination table (FIG. 2) stored in the ROM of the memory section. The battery type discrimination table illustrated in FIG. 2 indicates a relationship between the battery types, the resistance values of the battery type discrimination resistors, the battery type discrimination voltages that appear at the voltage-dividing point 18a when the reference voltage Vcc is divided by the battery type discrimination resistor and the voltage-dividing resistor 18, and the voltage range used for the controller 14 to discriminate the battery type. Incidentally, the battery type discrimination resistors have unique resistance values corresponding to respective ones of the battery types.

For example, as illustrated in FIG. 2, in a case where the battery type of the battery pack is Type A, the battery pack has the battery type discrimination resistor having a resistance value of 1 kΩ. When the battery pack of Type A is connected to the power tool 1, the reference voltage Vcc (5V) is divided by the battery type discrimination resistor having the resistance value of 1 kΩ and the voltage-dividing resistor 18 having the resistance value of 10 kΩ, so that the battery type discrimination voltage outputted to the controller 14 is theoretically 0.5V.

When the battery type discrimination voltage inputted to the controller 14 is within a voltage range of 0 to 1.0V, the controller 14 discriminates that the battery type is Type A. In this way, the controller 14 uses the predetermined voltage range in order to discriminate the battery type while taking errors in the outputted battery type discrimination voltage into consideration. The voltage range is set to a range of ±0.5V with respect to the theoretical output battery type discrimination voltage (0.5V in case of Type A). The reasons why the errors in the battery type discrimination voltage which is outputted to the controller 14 occur include individual difference in resistance value among the type discrimination resistors, variation in resistance value of each of the voltage-dividing resistor 18 and the battery type discrimination resistor due to temperature change or the like, and variation in the reference voltage Vcc.

As illustrated in FIG. 2, in a case where the battery type of the battery pack connected to the power tool 1 is Type B, the battery type discrimination resistor is 4.3 kΩ, the battery type discrimination voltage is theoretically 1.5V, and the voltage range used for the controller 14 to discriminate Type B is from 1.0V to 2.0V. In a case where the battery type is Type C, the battery type discrimination resistor is 10 kΩ, the battery type discrimination voltage is theoretically 2.5V, and the voltage range used for the controller 14 to determine Type C is from 2.0V to 3.0V. In a case where the battery type is Type D, the battery type discrimination resistor is 24 kΩ, the battery type discrimination voltage is theoretically 3.5V, and the voltage range used for the controller 14 to determine Type D is from 3.0V to 4.0V. In a case where the battery type is Type E, the battery type discrimination resistor is 91 kΩ, the battery type discrimination voltage is theoretically 4.5V, and the voltage range used for the controller 14 to determine Type E is from 4.0V to 5.0V.

Next, the setting of the cutoff condition by the controller 14 will be described. The controller 14 sets the cutoff condition in accordance with the discriminated battery type of the battery pack 2. Specifically, the controller 14 sets the cutoff condition that is suitable for the determined battery type, by referencing the cutoff condition table (FIG. 3) stored in the ROM of the memory section.

The cutoff condition table of FIG. 3 illustrates cutoff conditions defined correspondingly to respective ones of battery types. As illustrated in FIG. 3, the cutoff condition is different for each battery type, and is defined for each battery type in consideration of characteristics of each battery type. The cutoff condition includes a cutoff condition on battery temperature, and a cutoff condition on discharge current.

First, the cutoff condition on battery temperature will be described. As illustrated in FIG. 3, different temperature thresholds are provided for the respective battery packs of Type A to E. When the battery temperature becomes equal to or higher than a corresponding temperature threshold, a corresponding cutoff condition is met. For example, in a case where the battery type of the battery pack is Type C, the cutoff condition on battery temperature is 70° C. or more (temperature threshold is 70° C.). In other words, when the battery temperature becomes equal to or higher than 70° C., the cutoff condition is met regardless of the discharge current. Here, the cutoff condition on battery temperature of Type A is 100° C. or more (temperature threshold is 100° C.), the cutoff condition on battery temperature of Type B is 80° C. or more (temperature threshold is 80° C.), the cutoff condition on battery temperature of Type D is 60° C. or more (temperature threshold is 60° C.), and the cutoff condition on battery temperature of Type E is 50° C. or more (temperature threshold is 50° C.). The temperature thresholds defined in the cutoff condition table of FIG. 3 are gradually lowered in the order of Type A, B, C, D, and E. This is because the rated temperature of Type A is the highest and the rated temperatures of Type B, C, D, and E are gradually lowered in this order. Here, the battery packs of Type A to E have different capacities from each other. The relationship of the capacities of Type A to E is expressed by A>B>C>D>E. The capacity is different depending on size of the battery cells and connection type of the battery cells. The capacity increases as the number of battery cells connected in parallel increases. For example, the temperature threshold of the battery pack (battery type C) with small capacity (e.g. 1-para) is set smaller than the temperature threshold of the battery pack (battery type A) with large capacity (e.g. 2-para). With this, in case of a tool, such as a grinder, which is used for continuous work, the use of a 1-para battery pack in which each battery cell is applied with more load than that in a 2-para battery pack is restricted (i.e., the temperature threshold is lowered). As a result, deterioration of the battery pack can be suppressed.

Next, the cutoff condition on discharge current will be described. As illustrated in FIG. 3, different cutoff conditions on discharge current are defined for each of the battery packs of Type A to E. The cutoff condition on discharge current is defined not simply by whether a discharge current equal to or greater than an overcurrent threshold is flowing (i.e., by whether an overcurrent is flowing), but by two factors, i.e., a magnitude of the overcurrent and a time period (an overcurrent continuing duration) during which the overcurrent continuously flows. Each of a time period of 10 seconds, a time period of 3 seconds, and a time period of 0.1 seconds illustrated in FIG. 3 is an allowable overcurrent continuing duration (allowable discharge duration or specific time period) which is defined in accordance with the magnitude of the overcurrent. When the allowable overcurrent continuing duration which is defined depending on the magnitude of the overcurrent elapses, the cutoff condition is met. The overcurrent threshold of the battery pack (battery type C) with small capacity (e.g. 1-para) is set smaller than the overcurrent threshold of the battery pack (battery type A) with large capacity (e.g. 2-para). With this, in case of a tool, such as a grinder, which is used for continuous work, the use of a 1-para battery pack in which each battery cell is applied with more load than that in a 2-para battery pack is restricted (i.e., the overcurrent threshold is lowered). As a result, deterioration of the battery pack can be suppressed. The cutoff condition on discharge current is an example of the specific condition on discharge current of the present invention. Also, the allowable overcurrent continuing duration is an example of the specific time period of the present invention.

As illustrated in FIG. 3, the magnitude of the overcurrent is classified into three classes in each of the battery types of Type A to E. The allowable overcurrent continuing duration decreases as the magnitude of the overcurrent increases. This is because the possibility of the deterioration or malfunction of the battery pack becomes greater as the overcurrent magnitude is greater and the overcurrent continuing duration is longer. For example, in a case where the battery type of the battery pack is Type D, the allowable overcurrent continuing duration is set to 10 seconds when the overcurrent has a relatively lower magnitude which is equal to or larger than 20 A and smaller than 40 A, the allowable overcurrent continuing duration is set to 3 seconds when the overcurrent has a moderate magnitude which is equal to or larger than 40 A and smaller than 60 A, and the allowable overcurrent continuing duration is set to 0.1 seconds when the overcurrent has a relatively higher magnitude which is equal to or larger than 60 A. Here, cutoff conditions on discharge current for battery types of Type A, B, C, and E are those as illustrated in the cutoff condition table of FIG. 3. In Type D, the current value which is equal to or larger than 20 A and smaller than 40 A is an example of the first current value of the present invention; the current value which is equal to or larger than 40 A and smaller than 60 A is an example of the first current value of the present invention and also is an example of the second current value of the present invention; the current value which is equal to or larger than 60 A is an example of the second current value of the present invention. Also in Type D, the time period of 10 seconds is an example of the first time period of the present invention; the time period of 3 seconds is an example of the first time period of the present invention and also is an example of the second time period of the present invention; the time period of 0.1 seconds is an example of the second time period of the present invention.

The overcurrent threshold is defined as 70 A in Type A, 50 A in Type B, 30 A in Type C, 20 A in Type D, and 10 A in Type E, the magnitude of the defined overcurrent threshold gradually decreases in the order of Type A, B, C, D, and E. This is because the rated discharge current of Type A is the highest and the rated discharge currents of Type B, C, D, and E are gradually lowered in this order. Here, each of the battery cell assembly of Type A and the battery cell assembly of Type B has a configuration in which two sets of serially-connected battery cells are connected in parallel to each other.

Next, the discharge control performed by the controller 14 will be described with reference to the flowchart of FIG. 4.

When a user manipulates the switch 15 to place the switch 15 in its on-state in a state where the battery pack 2 is connected to the power tool 1, in Step 201 the discharge control is started by the controller 14. At this time, the reference voltage Vcc is generated in the power tool 1. After the reference voltage Vcc is generated, the reference voltage Vcc is divided by the voltage-dividing resistor 18 and the battery type discrimination resistor 26 of the battery pack 2. As a result, the battery type discrimination voltage appears at the voltage-dividing point 18a. In the present embodiment, since the battery type of the battery pack 2 is Type C and the resistance value of the battery type discrimination resistor 26 is 10 kΩ, the battery type discrimination voltage is 2.5V.

In Step 202, the controller 14 detects the battery type discrimination voltage appearing at the voltage-dividing point 18a. After detecting the battery type discrimination voltage, in Step 203 the controller 14 discriminates the battery type (for example, capacity of the battery pack) on the basis of the battery type discrimination table of FIG. 2. In the present embodiment, the controller 14 determines that the battery type discrimination voltage is within the voltage range from 2.0V to 3.0V, and thus discriminates that the battery type of the battery pack 2 is Type C.

After discriminating the battery type of the battery pack 2 connected to the power tool 1, in Step 204 the controller 14 sets the cutoff condition in accordance with the discriminated battery type of the battery pack 2. In the present embodiment, the controller 14 references the cutoff condition table of FIG. 3 which is stored in the ROM of the memory section, and sets the cutoff condition used for the battery pack of Type C.

After setting the cutoff condition, the controller 14 starts driving the motor 11 in Step 205. For starting driving the motor 11, the controller 14 outputs a high signal to the gate of the FET 13 to place the FET 13 in its on-state. Then, the controller 14 continues outputting the high signal to maintain the on-state of the FET 13, thereby driving the motor 11.

After the driving of the motor 11 is started, the controller 14 detects the discharge current and the battery temperature in Step 206. The detection of the discharge current is performed using the shunt resistor 16. The controller 14 calculates a current value of the discharge current from a voltage drop value of the shunt resistor 16. The detection of the battery temperature is performed using the divided voltage appearing at the voltage-dividing point 17a, that is, using the battery temperature signal.

After the discharge current and the battery temperature are detected, the controller 14 determines whether or not the set cutoff condition is met. In the present embodiment, since the battery type of the battery pack 2 is Type C (1-para battery pack with small capacity), the cutoff condition is met in each of four cases: a first case where the battery temperature is equal to or higher than 70° C.; a second case where the battery temperature is lower than 70° C. and the discharge current (overcurrent) equal to or higher than 30 A and lower than 60 A has continuously flowed for 10 seconds or more; a third case where the battery temperature is lower than 70° C. and the discharge current (overcurrent) equal to or higher than 60 A and lower than 80 A has continuously flowed for 3 seconds or more; and a fourth case where the battery temperature is lower than 70° C. and the discharge current (overcurrent) equal to or higher than 80 A has continuously flowed for 0.1 seconds or more.

When the controller 14 determines that the cutoff condition is met in Step 207 (Step 207: Yes), the controller 14 cuts off the discharge current and stops the motor 11 in Step 211. The controller 14 stops outputting the high signal to the FET 13 (in other words, the controller 14 outputs a low signal to the FET 13) to place the FET 13 in its off-state, thereby cutting off the discharge current and stopping the motor 11. When the discharge current is cut off, the discharge control by the controller 14 ends and the discharge from the battery pack 2 stops.

On the other hand, when the controller 14 determines that the cutoff condition is not met in Step 207 (Step 207: No), the controller 14 continues to drive the motor 11 and detects a battery cell assembly voltage in Step 208. The detection of the battery cell assembly voltage is performed by measuring the voltage across the battery cell assembly 21, i.e., by measuring the both-end voltage of the battery cell assembly 21 which is a voltage applied between the positive terminal 12A and the negative terminal 12B.

After detecting the battery cell assembly voltage, in Step 209 the controller 14 determines whether or not the battery cell assembly voltage is lower than 10.0V. When the controller 14 determines, in Step 209, that the battery cell assembly voltage is not lower than 10.0V (Step 209: No), the controller 14 returns to Step 205 and continues to drive the motor 11.

On the other hand, when the battery cell assembly voltage is lower than 10.0V (Step 209: Yes), in Step 210 the controller 14 determines whether or not the discharge stop signal has been outputted from the battery pack 2. When the discharge stop signal has not been outputted (Step 210: No), the controller 14 returns to Step 205 and continues to drive the motor 11.

When the discharge stop signal has been outputted in Step 210 (Step 210: Yes), the controller 14 stops the motor in Step 211. Step 209 and Step 210 are steps for determining whether or not the battery cell assembly 21 of the battery pack 2 is in an over-discharge state. When the result of the determination performed by the power tool 1 and the result of the determination performed by the battery pack 2 agree with each other (Step 209: Yes and Step 210: Yes), the discharge current is cut off.

Thus, while Step 205 to Step 210 are repeated, the determination of whether the discharge current is to be cut off is performed by using the cutoff condition based on the battery type of the battery pack 2 every time the process passes thorough the Step 207. Further, the driving of the motor 11 is continued while the determination of whether the battery pack 2 is in an over-discharge state is performed in Step 209 and Step 210. When the user manipulates the switch 15 to place the switch 15 in its off-state, the discharge control by the controller 14 ends.

As described above, the controller 14 of the power tool 1 according to the embodiment of the present invention performs the determination of the battery type of the battery pack 2 connected to the power tool 1 and the detection of the discharge current flowing through the motor 11. Further, the controller 14 cuts off the discharge current when the cutoff condition, used to determine whether the discharge current should be cut off, is met, and changes the cutoff condition in accordance with the battery type of the battery pack connected to the power tool 1. With this, the power tool 1 can set an appropriate cutoff condition for each of battery packs having different battery types, and can allow each of the battery packs to exhibit its sufficient performance while appropriately protecting each of the battery packs. That is, the power tool 1 according to the embodiment of the present invention can perform the appropriate discharge control for each of the battery packs having different battery types.

Also, the controller 14 detects the battery temperature of the battery pack 2, and when the battery temperature that has significant influence on deterioration or malfunction of the battery pack 2 becomes equal to or higher than the temperature threshold, the controller 14 can cut off the discharge current regardless of whether or not the cutoff condition on discharge current is met. With this, the deterioration or malfunction of the battery pack 2 can be more effectively restrained.

Moreover, in the power tool 1, the cutoff condition on discharge current is met when a state where the discharge current is equal to or larger than the overcurrent threshold continues for the allowable overcurrent continuing duration. Thus, when the state where the discharge current is equal to or larger than the overcurrent threshold occurs and the state lasts for the allowable overcurrent continuing duration, the discharge current is cut off. Accordingly, by appropriately setting the allowable overcurrent continuing duration, the discharge, i.e., work can be continued without cutting off the discharge current when the discharge current becomes equal to or larger than the overcurrent threshold only for a moment (when the motor is started). This control can improve work efficiency.

In the power tool 1, when the discharge current is a relatively lower overcurrent (30 A or more and less than 60 A in Type C) whose magnitude is equal to or larger than the overcurrent threshold (30 A in Type C), the allowable overcurrent continuing duration is the time period of 10 seconds. Further, when the discharge current is a moderate overcurrent (60 A or more and less than 80 A in Type C) whose magnitude is larger than that of the relatively lower overcurrent, the allowable overcurrent continuing duration is the time period of 3 seconds which is shorter than the time period of 10 seconds. Still further, when the discharge current is a relatively higher overcurrent (80 A or more in Type C) whose magnitude is larger than the moderate overcurrent, the allowable overcurrent continuing duration is the time period of 0.1 seconds which is shorter than the time period of 3 seconds.

Thus, in a state where the discharge current that is equal to or larger than the overcurrent threshold flows, the discharge current is larger, the discharge current can be cut off with a shorter period of time. With this, the discharge current whose magnitude greatly exceeds the overcurrent threshold can be cut off with a shorter period of time, and thus deterioration or malfunction of the battery pack can be appropriately suppressed. Further, the discharge current whose magnitude slightly exceeds the overcurrent threshold can flow for a longer period of time than a period of time for which the discharge current whose magnitude greatly exceeds the overcurrent threshold can flow. This control can improve work efficiency.

Figure 5:
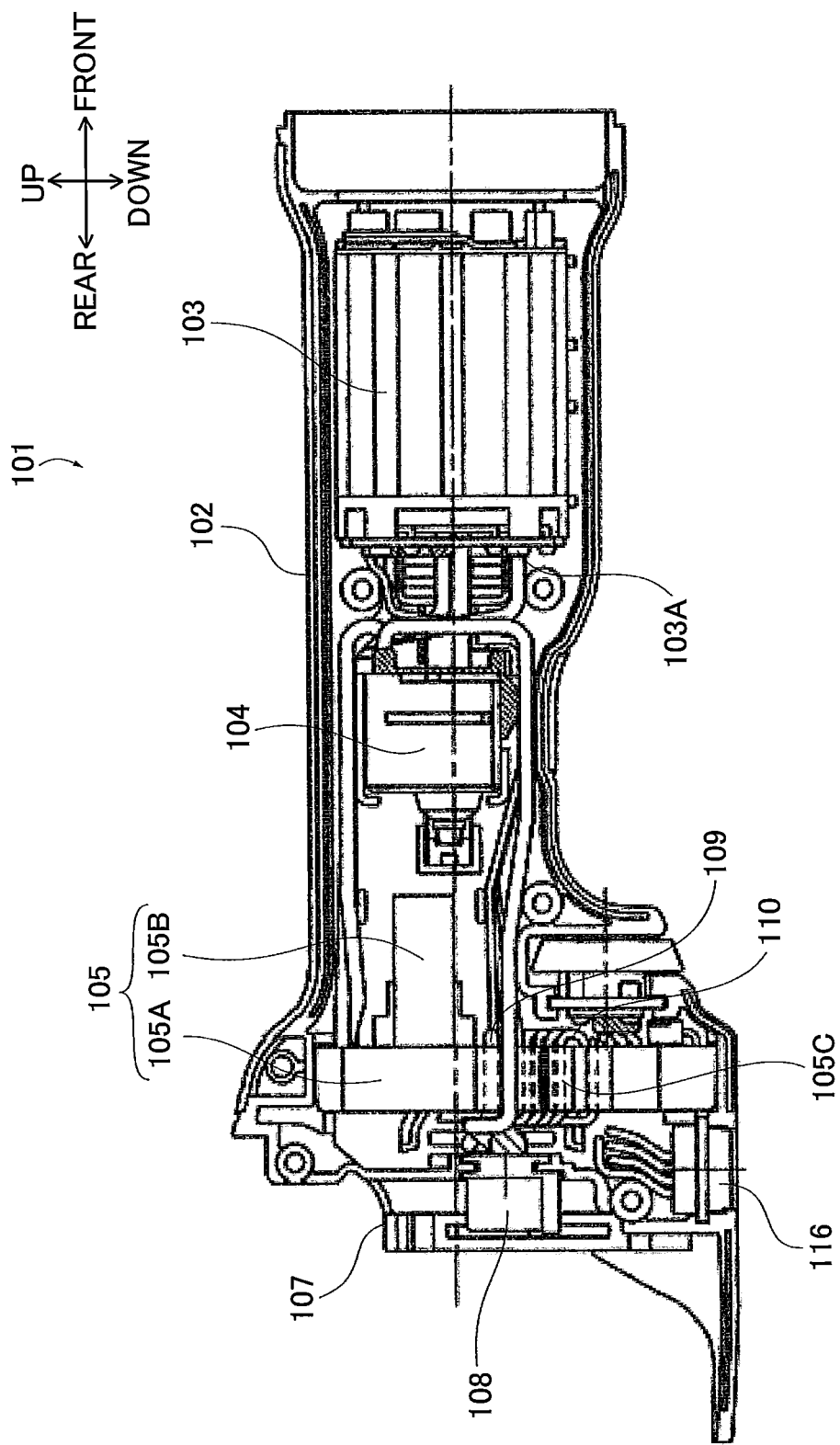
FIG. 5 is a partial cross-sectional side view illustrating a rear portion of a power tool according to a modification of the embodiment of the present invention.

Next, with reference to FIGS. 5 to 8, a power tool 101 according to a modification of the embodiment of the present invention will be described. The power tool 101 illustrated in FIG. 5 is an electrically powered tool in which grinding work can be performed by rotating an output part (not illustrated) to which a disk-shaped grindstone (not illustrated) or the like has been attached. The power tool 101 is a disk grinder. In the power tool 101, a microcomputer (not illustrated) mounted on a later-described circuit board (not illustrated) performs discharge control. Since the discharge control performed by the microcomputer of the power tool 101 is the same as that performed by the controller 14 of the power tool 1, the description thereof is omitted. Here, an internal configuration of a housing 102 of the power tool 101 will be described. Directions of arrows depicted in FIGS. 5 to 8 are defined as front, rear, left, right, up, and down directions for convenience of the description.

As illustrated in FIG. 5, the power tool 101 includes the housing 102 that forms an outer shell of the power tool 101. The housing 102 is provided with a battery attachment part 107 at a rear end part thereof. The battery attachment part 107 is formed to have a shape connectable to the battery pack (not illustrated). The battery attachment part 107 has a connection terminal 108. The connection terminal 108 is configured to be connected to the battery-side terminal part of the battery pack in a state where the battery pack is connected to the battery attachment part 107. When the connection terminal 108 and the battery-side terminal part are connected to each other, electric power can be supplied from the battery pack to the power tool 101. FIG. 5 is a partial cross-sectional side view which illustrates a rear portion of the power tool 101. The battery attachment part 107 is an example of the battery connecting part of the present invention. The connection terminal 108 is an example of the battery connecting part of the present invention.

The housing 102 accommodates therein a brushless motor 103, a power switch 104, a control unit 105, and a remaining-amount display part 106.

The brushless motor 103 is a three-phase brushless DC motor which includes a rotor having permanent magnets, a stator having three-phase windings, and a rotation shaft which is coaxially rotatably fixed to the rotor. The brushless motor 103 is accommodated within a rear part of the housing 102 such that a direction in which the rotation shaft extends is coincident with the front-rear direction. A Hall sensor board 103A is installed at a rear end part of the brushless motor 103. The Hall sensor board 103A is used to detect the position of the rotor of the brushless motor 103. The brushless motor 103 is an example of the motor of the present invention.

The power switch 104 is a switch mechanism which allows and cuts off the discharge current that flows in the brushless motor 103. The power switch 104 is accommodated within the housing 102 and is positioned rearward of the Hall sensor board 103A.

The control unit 105 includes a circuit board case 105A, heat radiation fins 105B, the circuit board (not illustrated), and six FETs (not illustrated). The microcomputer that performs the discharge control for the power tool 101 is mounted on the circuit board. The circuit board case 105A is provided rearward of the power switch 104 within the housing 102. The circuit board case 105A has a tank shape whose front end part opens, and is substantially rectangular as viewed in the front-rear direction. The circuit board (not illustrated) and the six FETs (not illustrated) are accommodated in the circuit board case 105A. The circuit board case 105A is filled with urethane resin, by which the circuit board and the six FETs are secured. The control unit 105 functions as the current detection means, the cut-off controlling means, the battery type discrimination means, and the battery temperature detection means of the present invention. The circuit board case 105A is an example of the accommodation case of the present invention.

The heat radiation fins 105B are structured to extend in the front-rear direction, and are provided so as to be in close contact with the six FETs. The six FETs are cooled by the heat radiation fins 105B. The remaining-amount display part 106 is accommodated rearward of and below the control unit 105. The remaining-amount display part 106 has a liquid crystal part which displays a remaining amount of the battery pack connected to the power tool 101. The liquid crystal part is configured so as to be visually recognizable through an opening formed at the housing 102.

Figure 6:
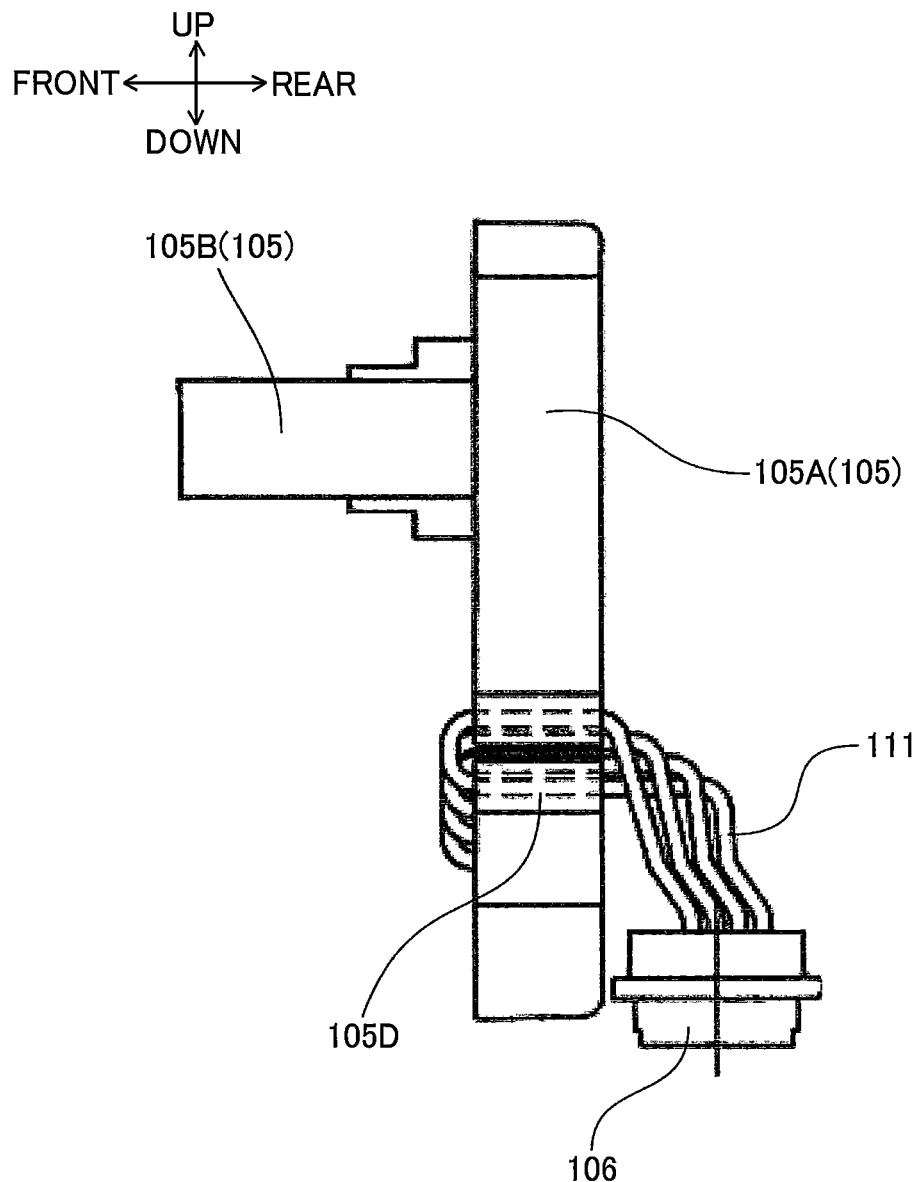
FIG. 6 is a left side view of a control unit of the power tool according to the modification of the embodiment of the present invention.

Two power-supply lead wires 109 (i.e., a positive power-supply lead wire and a negative power-supply lead wire), a plurality of control lead wires 110, and a plurality of display lead wires 111 extend from the circuit board. The two power-supply lead wires 109 and the plurality of control lead wires 110 once extend frontward from the circuit board, bend rearward, pass through a right side with respect to the right side-surface of the circuit board case 105A, and are connected to the connection terminal 108 positioned rearward of the circuit board case 105A. In addition, as illustrated in FIG. 6, the plurality of display lead wires 111 once extend frontward from the circuit board, bend rearward, pass through a left side with respect to the left side-surface of the circuit board case 105A, and are connected to the remaining-amount display part 106 positioned rearward of and below the circuit board case 105A. FIG. 6 is a left side view illustrating the control unit 105.

Figure 7:
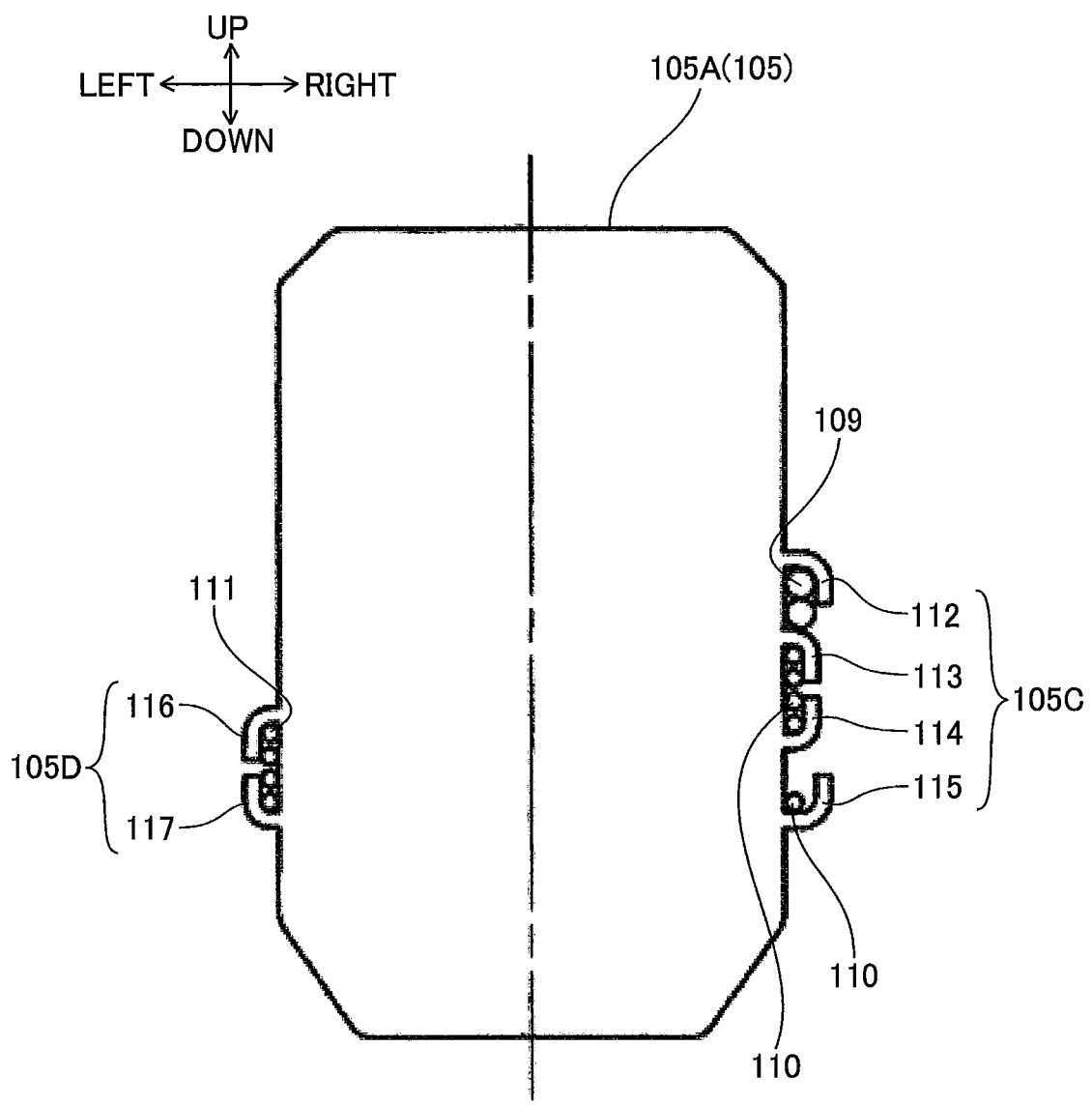
FIG. 7 is a rear view of the control unit of the power tool according to the modification of the embodiment of the present invention.
Figure 8:
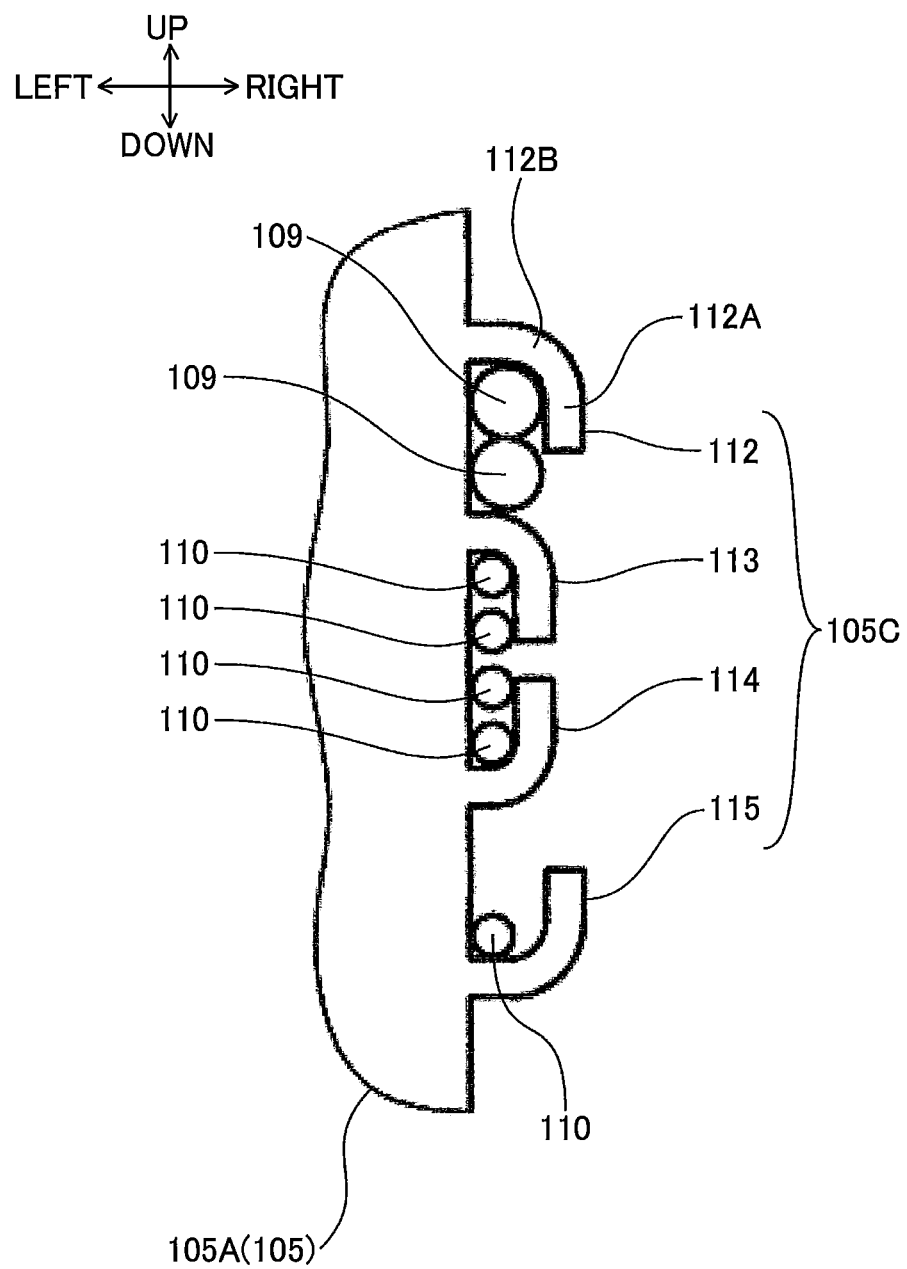
FIG. 8 is a partial enlarged view of FIG. 7 illustrating a right rib portion of a circuit board case in the power tool according to the modification of the embodiment of the present invention.

As illustrated in FIGS. 5 to 8, a right rib portion 105C (FIGS. 5, 7, 8) is provided at the right side-surface of the circuit board case 105A, and a left rib portion 105D (FIGS. 6, 7) is provided at the left side-surface of the circuit board case 105A. FIG. 7 is a rear view illustrating the control unit 105. FIG. 8 is a partial enlarged view of FIG. 7 which illustrates the right rib portion 105C.

As illustrated in FIG. 7, the right rib portion 105C is a portion which holds the two power-supply lead wires 109 and the plurality of control lead wires 110, which extend from the circuit board and are connected to the connection terminal 108, while the two power-supply lead wires 109 and the plurality of control lead wires 110 are in contact with the right side-surface of the circuit board case 105A. The right rib portion 105C includes a first right rib 112, a second right rib 113, a third right rib 114, and a fourth right rib 115. The left rib portion 105D is a portion which holds the plurality of display lead wires 111, which extend from the circuit board and are connected to the remaining-amount display part 106, while the plurality of display lead wires 111 are in contact with the left side-surface of the circuit board case 105A. The left rib portion 105D includes a first left rib 116 and a second left rib 117.

Here, the shape of the first right rib 112 will be described. The first right rib 112, the second right rib 113, the third right rib 114, the fourth right rib 115, the first left rib 116, and the second left rib 117 are different from each other in size, but are substantially the same or symmetrical in shape, and thus the description of other ribs other than the first right rib 112 will be omitted.

As illustrated in FIG. 8, the first right rib 112 includes a parallel portion 112A and a curved portion 112B. The parallel portion 112A extends in the up-down direction in parallel to the right side-surface of the circuit board case 105A. The parallel portion 112A has a length the same as the length in the front-rear direction of the circuit board case 105A. The parallel portion 112A nips the power-supply lead wires 109 in cooperation with the right side-surface of the circuit board case 105A. The curved portion 112B is a portion which connects the top portion of the parallel portion 112A and the circuit board case 105A. The curved portion 112B extends rightward from the right side-surface of the circuit board case 105A, and bends downward as it goes rightward. The curved portion 112B has a length the same as the length in the front-rear direction of the circuit board case 105A. The curved portion 112B restricts the power-supply lead wires 109 from moving upward.

In this way, the power tool 101 according to the modification of the embodiment of the present invention includes the circuit board case 105A that accommodates the circuit board, and the circuit board is configured to be connected to the battery pack via the two power-supply lead wires 109 and the plurality of control lead wires 110. The circuit board case 105A has the right rib portion 105C that holds the two power-supply lead wires 109 and the plurality of control lead wires 110. With this configuration, since the two power-supply lead wires 109 and the plurality of control lead wires 110 that connect the circuit board to the battery pack are held by the circuit board case 105A, breaking of the power-supply lead wires 109 and the control lead wires 110 due to vibration can be suppressed, and improved assemblability can be obtained.

While the invention has been described in detail and with reference to the embodiments thereof, it would be apparent to those skilled in the art that various changes and modifications may be made therein without departing from the spirit and scope of the invention. In the present embodiment, the configuration is employed in which: the temperature threshold is set as the cutoff condition on battery temperature; and the cutoff condition is met and thus the discharge current is cut off when the battery temperature becomes equal to or higher than the temperature threshold. Alternatively, another configuration may be employed in which, when the battery temperature becomes equal to or higher than the temperature threshold, the discharge current is not cut off, but the cutoff condition on discharge current is changed depending on a level of the battery temperature. In this case, more precise discharge control can be performed, and thus more appropriate discharge control can be performed.

In addition, although the magnitude of the overcurrent is classified into three classes in the present embodiment, it is not limited to this, and may be classified into 5 or 10 classes. In this case, more precise discharge control can be performed, and thus more appropriate discharge control can be performed.

Furthermore, although the discrimination of the battery type of the battery packs is performed on five types in the present embodiment, it is not limited to this, but may be performed on more types as long as the controller 14 can discriminate. In this case, more appropriate discharge control can be performed on more types of the battery pack.

REFERENCE SIGNS LIST

1, 101: power tool, 2: battery pack, 11: motor, 12: tool-side terminal part, 12C: temperature terminal, 12E: discrimination terminal, 14: controller, 15: switch, 16: shunt resistor, 21: battery cell assembly, 21A: battery cell, 22: battery-side terminal part, 26: battery type discrimination resistor, 102: housing, 103: brushless motor, 105: control unit, 105A: circuit board case, 105C: right rib portion, 105D: left rib portion, 109: power-supply lead wire, 110: control lead wire, Vcc: reference voltage

The invention claimed is:
1. A power tool comprising:
 a battery connecting part to which a battery pack is detachably attachable;
 a motor driven by electric power supplied from the battery pack; and
 a controller configured to:

detect a discharge current which flows from the battery pack to the motor;

when a specific condition on the discharge current is met, cut off the discharge current; and discriminate a battery type of the battery pack connected to the battery connecting part, wherein the specific condition is changed in accordance with the battery type of the battery pack wherein the specific condition is met when a state where the discharge current is equal to or larger than an overcurrent threshold continues for a specific time period, wherein when the discharge current is equal to a first current value which is equal to or larger than the overcurrent threshold, the specific time period is a first time period, and wherein when the discharge current is equal to a second current value which is larger than the first current value, the specific time period is a second time period which is shorter than the first time period.

2. The power tool according to claim 1, wherein the controller is further configured to:

detect a battery temperature of the battery pack, and when the battery temperature is equal to or higher than a temperature threshold, cut off the discharge current regardless of whether the specific condition is met.

3. The power tool according claim 1, further comprising an accommodation case accommodating the controller, wherein the controller is configured to be connected to the battery pack through a lead wire, and wherein the accommodation case has a rib portion holding the lead wire.

4. The power tool according to claim 1, wherein the controller is further configured to cut off the discharge current when a discharge stop signal is outputted from the battery pack connected to the battery connecting part.

5. The power tool according to claim 1, wherein the overcurrent threshold differs depending on a capacity of the battery pack.

* * * * *